July 28, 1970   B. R. TUCKER   3,521,930
VEHICLE GRAVITY BED

Filed Nov. 29, 1967   4 Sheets-Sheet 1

INVENTOR.
BOBBIE R. TUCKER
BY M. A. Hobbs
ATTORNEY

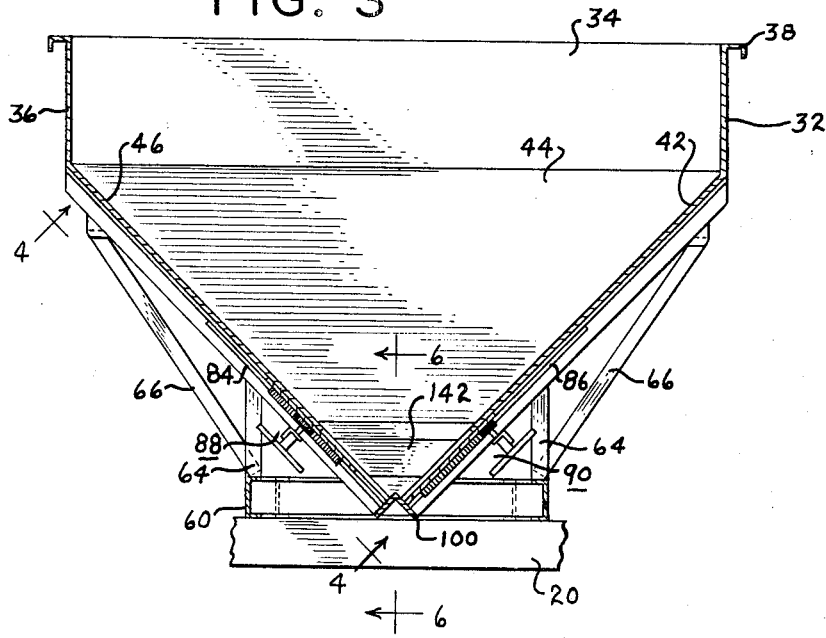
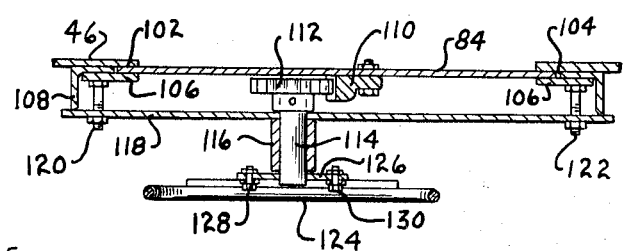
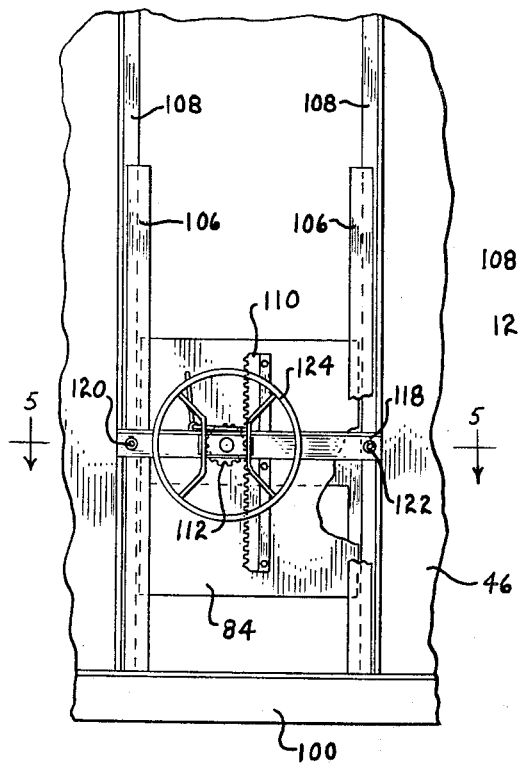

INVENTOR.
BOBBIE R. TUCKER
BY *M A Hobbs*
ATTORNEY

July 28, 1970     B. R. TUCKER     3,521,930
VEHICLE GRAVITY BED
Filed Nov. 29, 1967     4 Sheets-Sheet 4
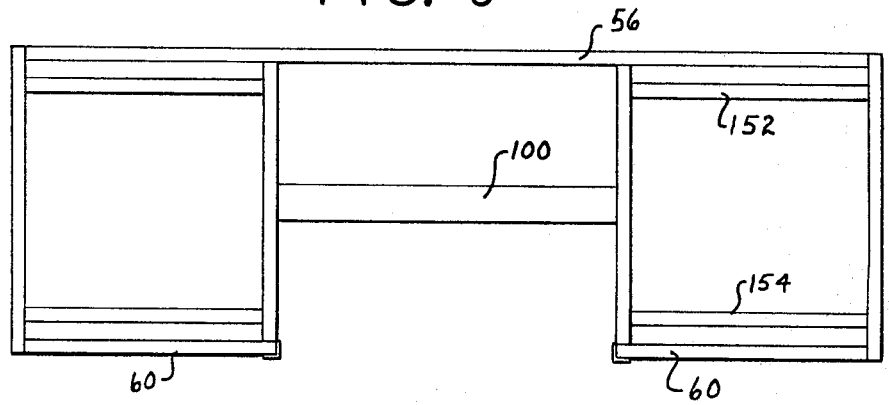
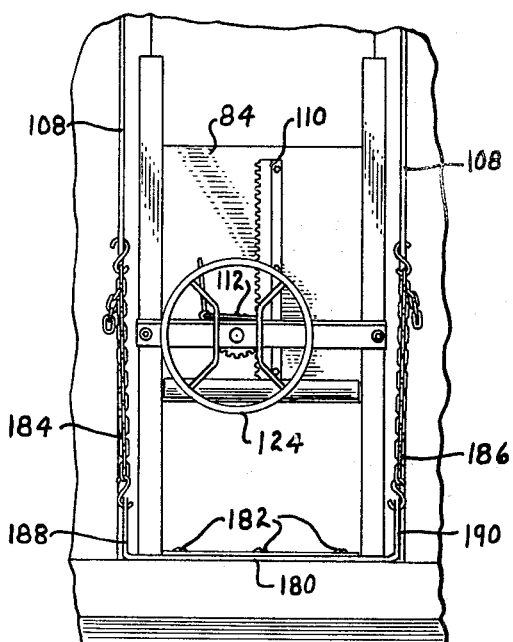
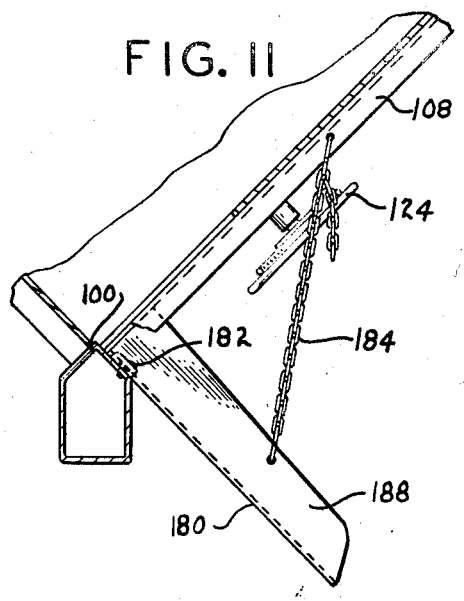
INVENTOR.
BOBBIE R. TUCKER
BY *M. A. Hobbs*
ATTORNEY United States Patent Office 3,521,930
Patented July 28, 1970

3,521,930
VEHICLE GRAVITY BED
Bobbie R. Tucker, Jefferson, Iowa, assignor to Parker Industries, Inc., Silverlake, Ind., a corporation of Indiana
Filed Nov. 29, 1967, Ser. No. 686,472
Int. Cl. B60p *1/56*
U.S. Cl. 298—24     10 Claims

ABSTRACT OF THE DISCLOSURE

A gravity bed for a vehicle in which the two side walls and two end walls slope toward the center of the bed and openings are provided in the side walls near the bottom thereof for discharging the contents of the bed. The openings are closed with plate-like doors which slide parallel to the sloping sides. One of the openings may be used to discharge the contents by gravity and the other of the doors used to connect an auger or other type of conveyor means to the bed for discharging the contents.

---

Gravity beds for wagons and other vehicles are being used extensively for a multitude of purposes on farms, the beds usually being mounted on a four wheeled wagon or trailer and pulled by tractors or trucks to various locations for loading through the open top and unloading through one or more doors at the bottom of the bed. In the past, these gravity beds have been primarily either a side discharge type in which the door is located at the side, with the bottom of the bed sloping from the other side to the door, or a center discharge type in which a single, horizontally positioned door is located in the center and the four sides of the bed slope inwardly and downwardly to the door. Both of these two types have certain inherent disadvantages. For example, the side discharge type requires maneuvering the vehicle to locate the side with the door at the place where the contents are to be unloaded, and the center discharge type involves difficulty in opening and closing the door and in reaching the discharge door to connect either a chute or an auger to the discharge opening. Further, in both of these types, with a single door when an auger or other type of conveyor is attached to the bed for unloading, the door can not be used to remove the contents by gravity without removing the auger, this being both inconvenient and time consuming. In the conventional types of beds with multiple doors, the bed will not empty completely by gravity unless all the doors are opened, thus requiring removal of the auger if the bed is to be completely unloaded without the use of the auger. It is therefore one of the principal objects of the present invention to provide a center discharge type gravity bed having a multiple door arrangement which permits the contents to be removed from either side or from both sides simultaneously and which can be completely emptied either by gravity alone or by gravity on one side and by an auger on the other side.

Another object of the invention is to provide a gravity bed of the center discharge type in which an auger can be permanently installed on one side and the bed used in the conventional manner, either for gravity discharge of the load or power discharge with the use of the auger, and which can be thoroughly cleaned without removing the auger from the bed.

Still another object of the invention is to provide a gravity bed with a center discharge in which the door can easily be operated in both the opening and closing directions, and in which the door closes by seating on a center support to form an effective seal which can not be sprung or jostled open by the load to inadvertently spill some of the bed contents.

Further objects and advantages of the invention will become apparent from the following description and accompanying drawings, wherein:

FIG. 3 is a vertical cross sectional view of the bed shown in the preceding figures, the section being taken on line 3—3 of FIG. 2;

FIG. 4 is an enlarged fragmentary side elevational view of the bed shown in the preceding figures, the view being taken on line 4—4 of FIG. 3;

FIG. 5 is an enlarged fragmentary cross sectional view, the section being taken on line 5—5 of FIG. 4;

FIGS. 9, 10 and 11 show a modified form of the present invention.

Figure 1:
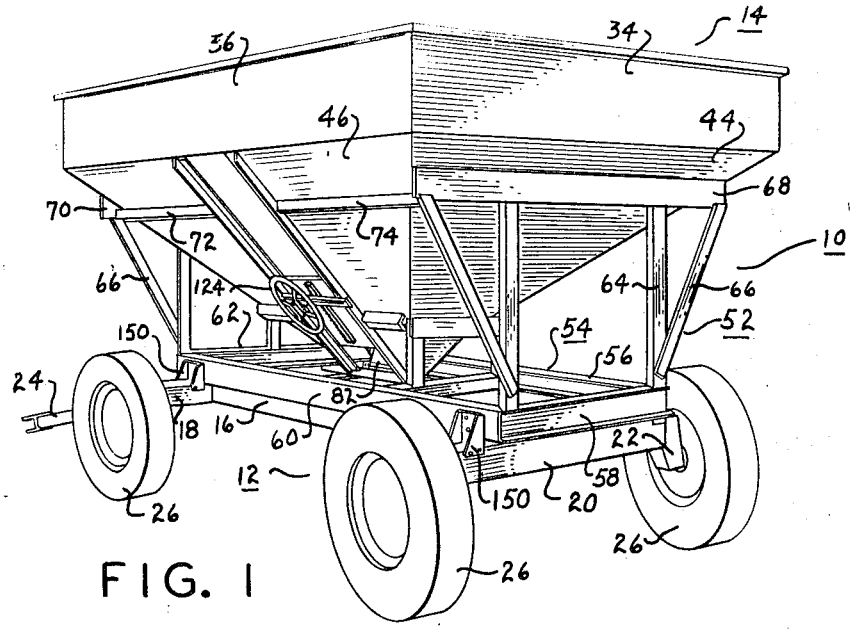
FIG. 1 is a perspective view of a wagon having the present gravity bed thereon.
Figure 2:
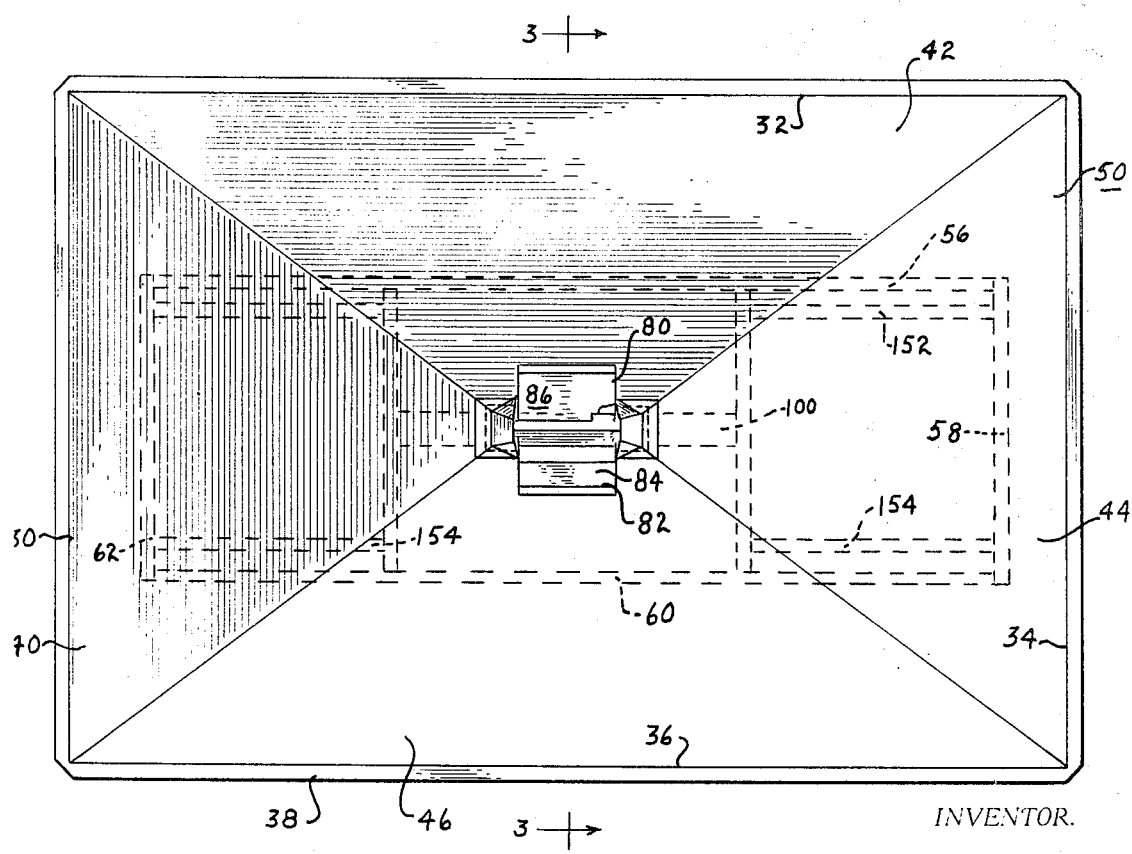
FIG. 2 is a top plan view of the gravity bed shown in FIG. 1.

Referring more specifically to the drawings and to FIG. 1 in particular, numeral 10 designates generally a wagon having the present gravity bed thereon, the undercarriage being designated by numeral 12 and the bed by numeral 14. The undercarriage may be considered conventional for the purpose of the present invention, consisting of a frame 16, and front and rear cross frame members 18 and 20, respectively, each having axles connected at the ends thereof by downwardly extending members 22. The wheels 26 are mounted on the axles and are normally provided with pneumatic tires, and the front wheels are steered by a tongue or drawbar 24 which is connected to a tractor, truck or other towing vehicle. The bed 14 may be used on a variety of different types of vehicles, including trailers and trucks, and the type of undercarriage shown in the drawings is merely for the purpose of illustration.

Bed 14 consists of four upper walls 30, 32, 34 and 36 of sheet steel joined together at the corners, preferably by welding and a rib or bead 38 is provided along the upper edge of the walls. Lower walls 40, 42, 44 and 46 are joined integrally with the respective upper walls and taper inwardly toward the center and are joined to one another along the edges by welding or other suitable joining means. The body 50 formed by the four upper and lower walls is supported by a frame 52 having a base 54 consisting of horizontal members 56, 58, 60 and 62 joined at their ends to one another and supporting vertical members 64 and 66 at each corner. The upper ends of members 64 and 66 are joined to upper horizontal members 68 and 70 at the ends of the body, and members 72 and 74 along the sides of the body are joined to the end members, the horizontal members 68, 70, 72 and 74 being secured to the external surface of the body. The frame members are rigidly secured to base 54 and to the horizontal members 68 and 70 to form a rigid supporting frame for the body so that the bed can be lifted and transported as a rigid unit.

Figure 8:
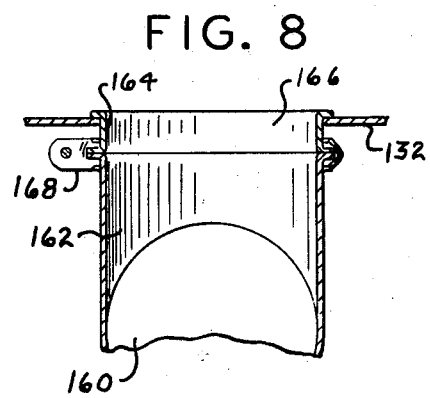
FIG. 8 is an enlarged fragmentary cross sectional view, the section being taken on line 8—8 of FIG. 7.
Figure 7:
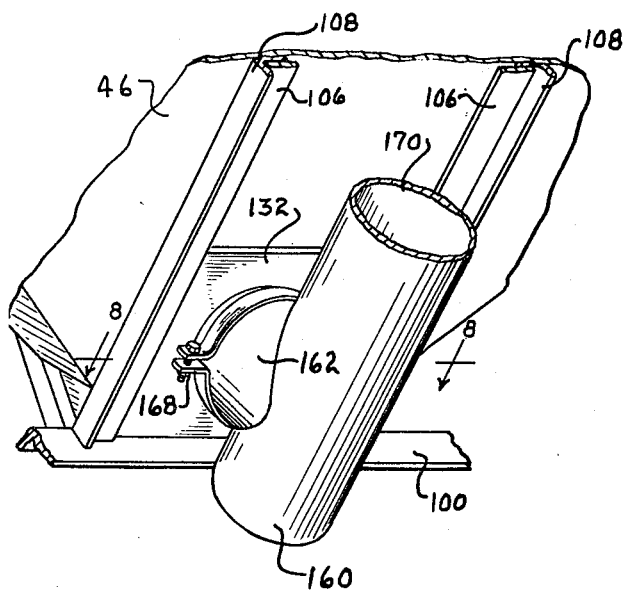
FIG. 7 is an enlarged fragmentary view of one side of the bed showing an auger connected to the bed.

Sides 42 and 46 have openings 80 and 82, respectively, with doors 84 and 86 closing the openings. Since the doors 84 and 86 and door operating mechanisms 88 and 90 therefor are identical in construction and operation, only one door and operating mechanism will be described in detail herein and the same numerals applicable to one will be used with reference to the other. The lower part of the opening is defined by an inverted V-shaped member 100 extending longitudinally under the body in the center thereof. The angular upper sides of the member form a seat for the lower edge of the two doors 84 and 86 so that there is created at the bottom of the doors when they are in fully closed position, an effective seal which can not readily be sprung or otherwise distorted by the load to cause accidental spillage of the bed contents. Each door is seated in grooves 102 and 104 formed by the external adjacent side of the body, and a longitudinal strip 106 held in spaced relation to the respective side by an angle iron member 108 secured to the side of the body. The door is raised and lowered by a rack and pinion mechanism including a rack 110 and a pinion, 112, the pinion being rotatably supported by a shaft 114 journalled in a sleeve 116 which in turn is connected to a cross member 118. The crossmember is supported at its two ends by bolts 120 and 122 rigidly joined to the respective strip 106. A hand wheel 124 is secured to the outer end of shaft 114 by a cross member 126 and bolts 128 and 130. Rotation of shaft 114 by hand wheel 124 rotates pinion 112 and raises and lowers doors 84 or 86 toward and away from their seat on member 100. When it is desired to remove one of the doors, the door is slid upwardly until it clears the upper end of strips 106 and then lifted outwardly from channel iron members 108. Another plate 132 may be inserted in grooves 102 and 104 for the purpose of installing an auger on the bed, in the manner illustrated in FIGS. 7 and 8.

Figure 6:
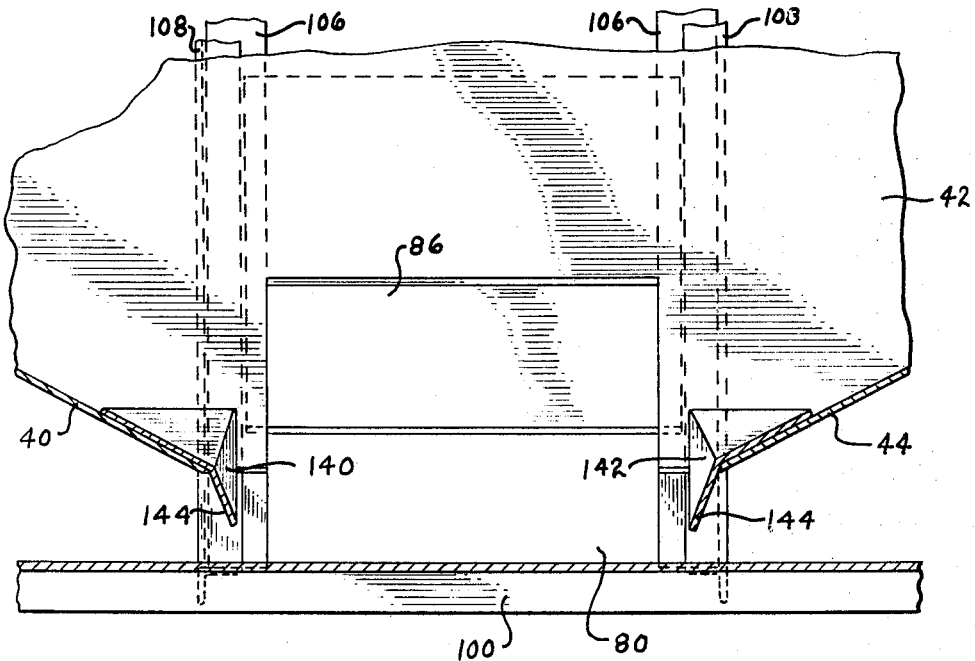
FIG. 6 is an enlarged fragmentary cross sectional view of the bed, the section being taken on line 6—6 of FIG. 3.

The construction of the bottom of the body is illustrated in FIG. 6 in which angular plate structures 140 and 142 are inserted in the bottom and project to approximately the edge of the two doors, each of the structures having downwardly extending portion 144 for directing the contents of the body downwardly toward the bottom of the openings, thereby minimizing the possibility of bridging which might otherwise occur in the opening and restrict the flow of contents from the body.

The bed just described may be mounted on the frame of an undercarriage in the manner illustrated in FIG. 1 and held in place thereon by an upwardly extending fixture 150 rigidly secured to cross members 18 and 20 near the ends thereof. The frame contains two additional longitudinal members 152 and 154 at each end of the base frame 54 in order to adapt the frame to different size vehicle undercarriages of different frame widths. Normally the bed is mounted on the frame in such a manner that it can easily be removed from and installed on the vehicle undercarriage.

In the use of the present gravity bed mounted on a suitable type vehicle, such as that shown in FIG. 1, with the doors closed the bed is filled from the top and the vehicle is transported to the place where the load is to be discharged. The wheel 124 is then rotated to cause pinion 112 to move rack 110 and door 84, for example, in the direction to open the door. As the door is retracted from member 100, the material flows through the opening by gravity. The four inclined sides 40, 42, 44 and 46 cause the material to feed to the opening. Door 86, for example, is positioned parallel with sides 42 and slopes downwardly to member 100, thus permitting the contents to flow smoothly to the open door 84. With all four sides and the opposite door sloping downwardly toward the open door, the entire contents of body 50 can easily be discharged through the one opening. A conveyor or gravity chute may be positioned beneath the opening for transporting the contents to their destination. If rapid discharge is desirable at the center of the vehicle, both doors 84 and 86 may be opened, thus doubling the area through which the contents may flow from the bed. With either one or both doors open, the contents of the bed can be completely removed by gravity and/or by an auger.

In the event an auger is to be used with the gravity bed, door 84 or 86 is removed, as previously described herein, and plate 132 is inserted in its place, the plate when fully inserted resting firmly on one of the angular surfaces of member 100. The auger 160 with a conduit 162 is secured by a clamp 168 to a flange 164 around the opening 166 in plate 132. The auger housing 170 may be rotated to various positions and may be left permanently installed on the bed and folded along the side thereof when the vehicle is being moved. When the auger is installed permanently on the bed, the bed can be unloaded by the auger at one of the doors and/or unloaded by gravity through the other of the doors. When the bed is to be cleaned, both doors may be fully opened and the inside of the body easily reached for thorough cleaning. When the doors are fully closed and ready for filling, they seat firmly on the upper angular side of member 100, and since they are positioned on a distinct incline, they can be raised much more readily and with less force than normally required with the conventional horizontally positioned doors of the center discharge type gravity bed. With the doors seated firmly on member 100, any distortion which might occur in the doors from an excess load in the bed does not result in displacing or cracking the doors in such a manner that spillage occurs.

In the modified form of the present invention illustrated in FIGS. 9, 10 and 11, the center part of horizontal frame member 60 has been removed in order to give easier access to opening 82. With the center portion of frame member 60 removed, the chute 180 can easily be attached to the lower portion of the bed using bolts 182 to secure the upper edge of the chute to the center frame member 100. The chute is supported by chains 184 and 186 connected at their lower ends to sides 188 and 190 respectively of the chute, and at their upper ends to members 108 on opposite sides of the door 84. In the modified form, when the door 84 is opened, using the mechanism previously described herein, the contents of the bed will readily flow from the bed through opening 82 and down the chute. The chute may be left in place on the bed after door 84 is closed and while the bed is being filled and the vehicle moved from one location to another.

While only one embodiment of the present vehicle bed has been described in detail herein, various changes and modifications may be made without departing from the scope of the invention.

I claim:

1. A bed for a vehicle comprising two side walls having an inwardly and downwardly slanting lower portion, two end walls having an inwardly and downwardly slanting lower portion and being joined at their edges to said side walls to form a body, a means on each of said side walls defining an opening at the bottom thereof in said slanting portion, a longitudinal frame member on each side spaced outwardly from and generally below the respective opening, cross members connected to said frame members positioned fore and aft of said openings for supporting the lower portion of said walls, a longitudinal horizontally positioned member supported by said cross members and separating the openings in the two opposite side walls, said end walls extending downwardly approximately to but above said horizontally positioned member and a relatively steep sloping part connecting the lower edge of each end wall with said horizontally positioned member and a sliding door for each of said openings.

2. A bed for a vehicle as defined in claim 1 in which said horizontally positioned member has two upper faces, each of said faces being perpendicular to the sliding door contacting the respective face.

3. A bed for a vehicle as defined in claim 1 in which said base has a plurality of longititudinally arranged members for adapting the bed to vehicles of varying width bed supporting structures.

4. A bed for a vehicle as defined in claim 1 in which one of said doors is a solid continuous plate and the other of said doors has a hole therein for connection with an auger mechanism.

5. A bed for a vehicle as defined in claim 1 in which a means is provided for raising and lowering each of said doors.

6. A bed for a vehicle as defined in claim 5 in which said means for raising and lowering said doors consists of a rack on each of said doors and a pinion rotatably engaging said rack.

7. A bed for a vehicle as defined in claim 2 in which a means is provided for raising and lowering each of said doors.

8. A bed for a vehicle as defined in claim 7 in which said means for opening and closing said doors consists of a rack on each of said doors and a pinion rotatably engaging said rack.

9. A bed for a vehicle comprising two side walls having an inwardly and downwardly slanting lower portion, two end walls having an inwardly and downwardly slanting lower portion and being joined at their edges to said side wall to form a body, a means on each of said side walls defining an opening at the bottom thereof in said slanting portion, a frame for holding said body in a rigid upright position including a horizontal base having on one side two aligned longitudinal side frame members, the adjacent ends of which are spaced from one another at the center to provide a space for access to the respective opening in the bed.

10. A bed for a vehicle as defined in claim 9 in which a downwardly and outwardly extending chute is disposed in said space and connected to said bed adjacent the bottom of said opening.

References Cited

UNITED STATES PATENTS

| | | | |
|---|---|---|---|
| 609,816 | 8/1898 | Kramer | 298—7 |
| 838,815 | 12/1906 | Shadbolt | 105—255 X |
| 1,957,497 | 5/1934 | Galanot | 296—28 |
| 2,169,463 | 8/1939 | Eisenberg | 298—7 |
| 2,768,021 | 10/1956 | Kaster | 298—27 X |
| 2,945,607 | 7/1960 | Blosser | 214—83.26 |
| 2,827,204 | 3/1958 | McCurdy. | |
| 3,337,068 | 8/1967 | Meharry | 214—83.26 |

RICHARD J. JOHNSON, Primary Examiner

U.S. Cl. X.R.

214—83.32